US008100572B2

(12) United States Patent
Liu et al.

(10) Patent No.: US 8,100,572 B2
(45) Date of Patent: Jan. 24, 2012

(54) LIGHT GUIDE DEVICE

(75) Inventors: Haijun Liu, Beijing (CN); Dae Keun Yoon, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 348 days.

(21) Appl. No.: 12/542,082

(22) Filed: Aug. 17, 2009

(65) Prior Publication Data

US 2010/0046247 A1 Feb. 25, 2010

(30) Foreign Application Priority Data

Aug. 19, 2008 (CN) .......................... 2008 1 0118584

(51) Int. Cl.
*F21V 7/04* (2006.01)
(52) U.S. Cl. ........ 362/608; 362/616; 362/613; 362/612; 362/615
(58) Field of Classification Search .................. 362/608, 362/609, 612, 613, 615, 616
See application file for complete search history.

(56) References Cited

U.S. PATENT DOCUMENTS

| 5,921,651 | A | * | 7/1999 | Ishikawa ........................ 362/624 |
| 6,789,910 | B2 | * | 9/2004 | Kimura et al. ................. 362/600 |
| 6,843,577 | B2 | * | 1/2005 | Kunimochi et al. .......... 362/610 |
| 2003/0147233 | A1 | | 8/2003 | Sugiura et al. |

FOREIGN PATENT DOCUMENTS

| CN | 1437058 A | 8/2003 |
| CN | 2627536 Y | 7/2004 |
| JP | 08-254618 A | 10/1996 |
| JP | 09-231822 A | 9/1997 |

\* cited by examiner

*Primary Examiner* — Evan Dzierzynski
(74) *Attorney, Agent, or Firm* — Ladas & Parry LLP

(57) ABSTRACT

A light guide device is provided in an embodiment of the invention. The light guide device comprises a light guide plate and a light source provided on a side surface of the light guide plate. A light guide strip is provided on a side surface of the light guide plate intersecting with the side surface provided with the light source. A side surface of the light guide strip facing the light guide plate is a light exit surface of the light guide strip, a side surface of the light guide strip opposite to the light exit surface is a reflective surface of the light guide strip, and an end surface of the light guide strip adjacent to the light source is a light entrance surface of the light guide strip.

17 Claims, 4 Drawing Sheets

LIGHT GUIDE DEVICE

BACKGROUND

Embodiments of the present invention relate to a light guide device in a liquid crystal display (LCD).

It is known that a liquid crystal panel in a liquid crystal display is the component for displaying images; however, the liquid crystal panel itself can not emit light and thus a light source with sufficient luminance and uniform intensity has to be provided for the liquid crystal panel. At present, a backlight of side-emission type is usually used to provide the light demanded by the liquid crystal display.

As shown in FIG. 1 and FIG. 2, a conventional backlight of side-emission type 100 comprises a light source 101, a reflective cover 102, a light guide plate 103, a bottom reflective film 104, a side reflective film 105, and optical sheets 106. Specifically, in operation, light is emitted from the light source 101, and collected by the reflective cover 102, and enter the light guide plate 103. Total reflection of the light in the light guide plate 103 is mostly prevented with the dot patterns formed on the bottom surface of the light guide plate 103 or other structures with similar function, and thus the light is scattered evenly. Then, the scattered light is emitted at the light exit surface of the light guide plate 103 after multiple reflections and refractions in the light guide plate 103 and finally modulated by the optical sheets 106 so as to provide a surface light source with uniform luminance. However, the conventional backlight of side-emission type has some disadvantages.

The light emitted from the light source enters into the light guide plate 103 through the side surfaces 110, 111 of the light guide plate 103 (shown in FIG. 2), and thus the light is modulated by the dot patterns mainly along the vertical direction, and it is difficult to control the luminance uniformity along the horizontal direction.

In addition, a cold cathode fluorescent lamp (CCFL) is usually used as for the light source 101 in the backlight of side-emission type 100, but a cold cathode fluorescent lamp has a disadvantage of non-uniform luminance. FIG. 3 shows the luminance distribution that occurs on both sides of the light guide plate 103. As shown in FIG. 3, a dim region that has a relatively less luminance than the normal regions on the light guide plate 103 is generated at each of the four corners of the backlight (in the luminance distribution shown in FIG. 3, a bright region is shown by a heavy tone and a dim region is shown by a light tone), and it is difficult to eliminate the dim regions.

SUMMARY

A light guide device is provided in an embodiment of the invention. The light guide device comprises a light guide plate and a light source provided on a side surface of the light guide plate. A light guide strip is provided on a side surface of the light guide plate intersecting with the side surface provided with the light source. A side surface of the light guide strip facing the light guide plate is a light exit surface of the light guide strip, a side surface of the light guide strip opposite to the light exit surface is a reflective surface of the light guide strip, and an end surface of the light guide strip adjacent to the light source is a light entrance surface of the light guide strip.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DESCRIPTION OF THE EMBODIMENTS

In order to resolve the problems that the luminance in the conventional backlight of side-emission type is not uniform and it is difficult to eliminate the dim regions at the corners of the backlight, a series of light sources of U shape and/or L shape can be employed to surround the light guide plate. With such structure, the light guide plate can receive light from four directions and the luminance and the luminance uniformity can be improved.

However, although the luminance is improved in the above mentioned backlight by providing additional light sources at the left and right sides of the light guide plate, the dim regions or the bright regions in the backlight are still not eliminated and the luminance uniformity needs to be improved further because it is also difficult to control the luminance distribution of the additional light sources and eliminate the disadvantages of the light sources themselves.

A light guide device is provided in an embodiment of the present invention to improve the luminance uniformity of a backlight of side-emission type. The light guide device provided according to an embodiment of the present invention is described in detail hereinafter with references to the drawings.

First Embodiment

Figure 1:
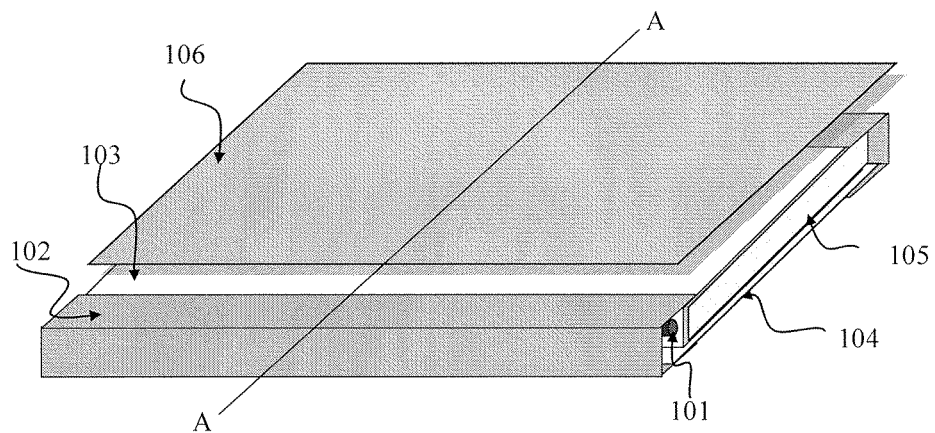
FIG. 1 is a structural schematic view showing a conventional backlight of side-emission type.
Figure 2:
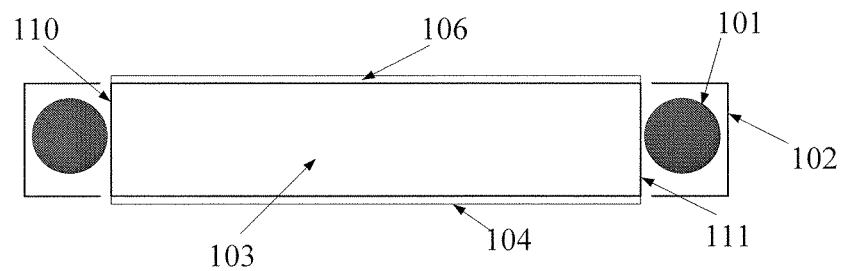
FIG. 2 is a sectional view taken along a line A-A in FIG. 1.
Figure 3:
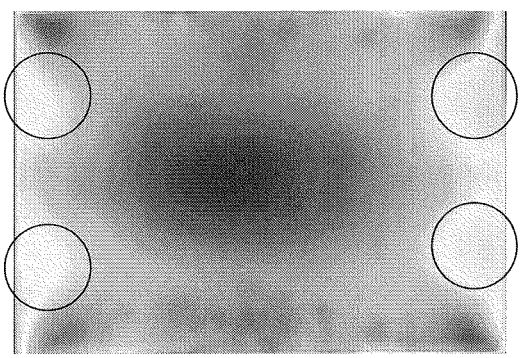
FIG. 3 is a diagram showing the luminance distribution of the conventional backlight of side-emission type.
Figure 4:
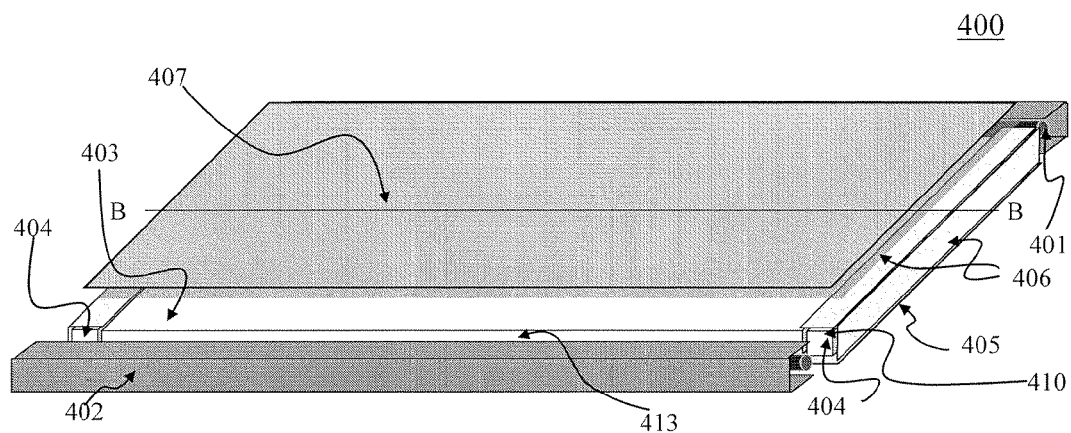
FIG. 4 is a structural schematic view showing a backlight according to a first embodiment of the invention.
Figure 5:
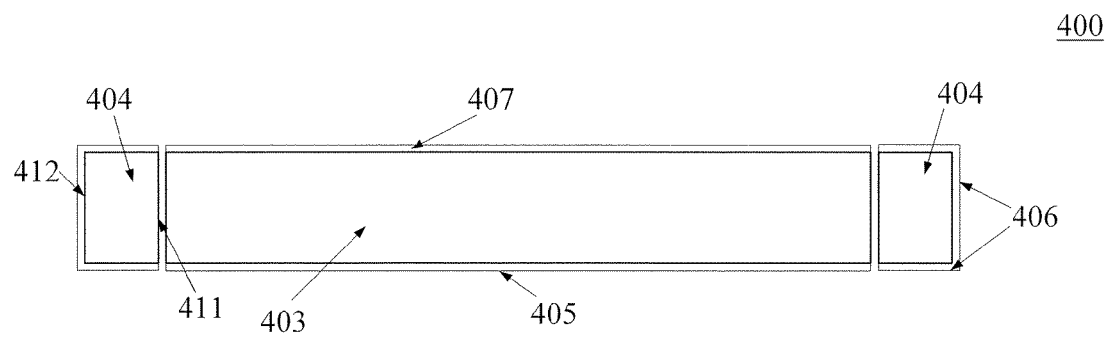
FIG. 5 is a sectional view taken along a line B-B in FIG. 2.

The light guide device 400 in the present embodiment is shown in FIG. 4 and FIG. 5. As shown in the figures, the light sources 401 are provided on two opposite sides of the light guide plate 403, additional light guide strips are provided on two sides of the light guide plate 403 adjacent to the light entrance surfaces of the light guide plate 403. The side surfaces of the light guide strip adjacent to the light sources 401 are defined as end surfaces (one of the end surfaces is the end surface 410 as shown in FIG. 4) and the end surfaces are the light entrance surfaces of the light guide strips 404. The surfaces 411 of the light guide strips 404, which face and contact the light guide plate 403, are the light exit surfaces of the light guide strips 404, and the surface 412 opposite to the light exit surface 411 is a reflective surface of each light guide strip. The side surfaces of the light guide plate 403 contacting with the light exit surfaces of the light guide strips 404 are also light entrance surfaces of the light guide plate 403. Here, the light guide strips may not contact the light guide plate directly, and there is may be some intermediate layer or a gap therebetween.

A portion of the light emitted from the light sources 401 enters into the light guide strips 404 through the light entrance surfaces of the light guide strips 404, and then enters into the light guide plate 403 through the side surfaces of the light guide plate 403 after multiple reflections and refractions in the light guide strips 404 to adjust the luminance distribution in the light guide plate 403, so that the luminance distribution in the light guide plate 403 can become uniform and the dim regions at the corners of the backlight are remarkably eliminated.

As shown in FIG. 4 and FIG. 5, the light guide device 400 in the present embodiment comprises: light sources 401 that for example are cold cathode fluorescent lamps (provided on two opposite sides of the light guide plate 403), a reflective cover 402, the light guide plate 403, light guide strips 404 (for example, two light guide strips) on two opposite sides of the light guide plate 403, a bottom reflective film 405, a reflective film 406, optical sheets 407, and the like.

Specifically, the top surface of the light guide plate 403 is its light exit surface, and on this light exit surface are provided the optical sheets 407; dot patterns may be further provided on the bottom surface of the light guide plate 403, and the bottom reflective film 405 is provided below the bottom surface of the light guide plate 403; and four side surfaces of the light guide plate 403 are its light entrance surfaces. The light sources 401 may also be a line light source such as a hot cathode fluoresce lamp or a light source formed by arranging a plurality of point light sources (e.g., LEDs) in line, and the light sources 401 are provided on two opposite side surfaces 413 of the light guide plate 403. Two light guide strips 404 are respectively provided on the two side surfaces of the light guide plate intersecting the side surfaces 413 on which a light source is provided. The end surfaces of the light guide strips 404 adjacent to the light sources 401 are the light entrance surfaces 410 of the light guide strips 404, the surfaces of the light guide strips 404 facing the light guide plate 403 are the light exit surfaces 411 of the light guide strips 404, the surfaces opposite to the light exit surfaces 411 are the reflective surfaces 412 of the light guide strips 404, and dot patterns may be preferably further provided on the reflective surfaces 412. The reflective film 406 is provided on each of the reflective surfaces 412 and the top and bottom surfaces of the light guide strips 404.

A portion of the light emitted from the light sources 401 is collected by the reflective covers 402 to enter into the light guide plate 403, and then modulated by the dot patterns on the bottom surface of the light guide plate 403 to provide a surface light source. The light entering into the light guide plate 403 supplies most of the light required by the backlight device 400. The side surfaces 413 of the light guide plate 403 are the main light entrance surface of the light guide plate.

A portion of the light emitted from the light source 401 enters into the light guide strips 404 through the light entrance surfaces 410 of the light guide strips 404, and is modulated by the dot patterns on the reflective surface 412 to obtain light rays with certain luminance distribution. The light rays with certain luminance distribution then enters into the light guide plate 403 through the light exit surfaces 411 of the light guide strips 404. Here, the "certain luminance distribution" means the light from the light guide strip is brighter to some extent near the dim regions of the light guide plate 403, and the light from the light guide strip is dimmer to some extent near the regions other than the dim regions of the light guide plate 403. In this way, the luminance distribution of the surface light sources 401 modified by the light guide plate 403 can become uniform and the dim regions at the corners of the backlight can be remarkably eliminated.

Figure 6:
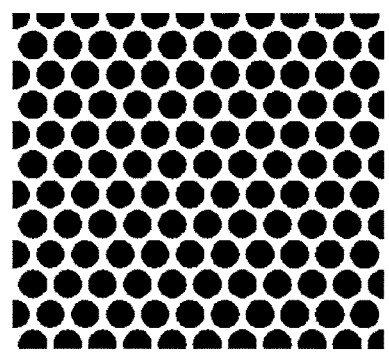
FIG. 6 is schematic view showing a dot arrangement on a light guide plate in the first embodiment of the invention.

In the present embodiment, dot patterns on the bottom surface of the light guide plate 403 are formed by printing, and each of the dot patterns can have a circular shape. As shown in FIG. 6, these dot patterns are arranged along a first direction and a second direction, and the angle between the first direction and the second direction is about 60°. The arrangement of these dot patterns enables the light from the light exit surface of the light guide plate to be uniform and bright. In addition, the shape of each of the dot patterns is not limited to the circular shape and may be an elliptic shape or any polygonal shape. The method for forming the dot patterns is not limited to the printing method and may be formed by etching, injecting, and the like. The angle between the first direction and the second direction is not limited to about 60° and may be about 45°, 90° or any other suitable angle. In addition, the method for forming the dot patterns, the shape of each of the dot patterns and the arrangement of the dot patterns may be combined depending on actual requirements as long as such combination enables the light emitted from the light exit surface to be uniform and bright.

Figure 7:
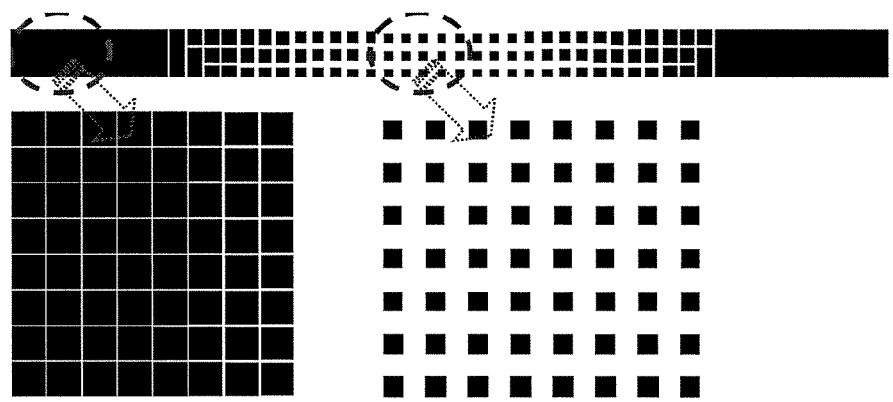
FIG. 7 is a schematic view showing a dot arrangement on a light guide strip in the first embodiment of the invention.

Similarly, dot patterns of the light guide strips are formed with the forming method, the shape, and the arrangement that are similar to those of the dot patterns formed on the bottom surface of the light guide plate. In the present embodiment, the dot patterns of the light guide strips have a larger distribution density at two ends on the reflective surface and have a smaller distribution density in the middle portion of the reflective surface to further adjust the luminance distribution of the dim regions at the corners of the light guide plate 403. Preferably, the dot patterns of the light guide strip 404 are formed by printing, each of the dot patterns has a square shape, and the angle between the first direction and the second direction along which the dot patterns arranged is about 90°, as shown in FIG. 7.

Figure 8:
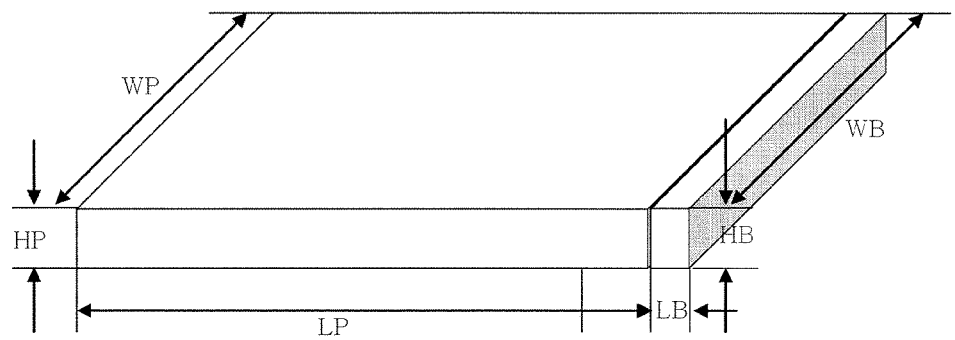
FIG. 8 is a schematic view showing the sizes of the light guide plate and the light guide strip in the first embodiment of the invention.

The effective light-emitting area of the backlight is determined by the size of the light guide plate 403, and the efficiency of the light from the light source is influenced by the size of the light guide strips 404. As shown in FIG. 8, the length, width and height of the light guide plate 403 are represented by LP, WP and HP, respectively. Each of the light guide strips 404 is formed as in a cuboid shape, and its length, width and height are represented by LB, WB and HB, respectively.

For example, the size of the light guide plate 403 can be determined by the standards applied in producing.

In the present embodiment, the size of the light guide strips 404 is required to satisfy the conditions that WP=WB and HP=HB to ensure that the light in the light guide strips can be fully used. The value of LB is determined based on the following factors: if the value of LB is too large, the area of the backlight edge from which no light is emitted is increased and accordingly the edge portion other than the display region in the liquid crystal display is increased, thus the production cost is increased and the appearance of the liquid crystal display is adversely influenced; if the value of LB is too small, the light guide strips cannot receive sufficient light. Therefore, it is preferable in the present embodiment that LB=HB/2.

In order that the light guide strip can receive sufficient light, the length of the light sources 401 is larger than the length LP of the light guide plate 403 but smaller than LP+2*LB; that is, two ends of the light sources 401 preferably extend beyond the light entrance surface of the light guide plate 403 but not beyond the light entrance surface of the light guide strips 404.

Figure 9:
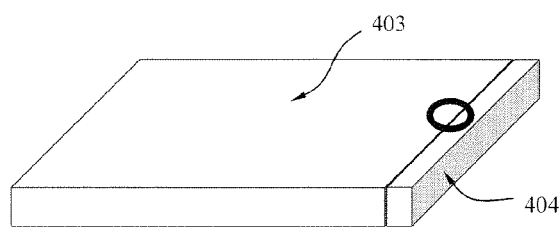
FIG. 9 a schematic view showing the connection relationship between the light guide plate and the light guide strip in the first embodiment of the invention.
Figure 10:
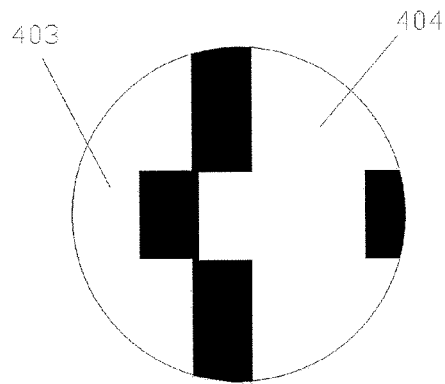
FIG. 10 is a top view showing the region indicated by the circle in FIG. 9.

FIG. 9 is a schematic view showing the connection relationship between the light guide plate 403 and the light guide strip 404 in the embodiment, and FIG. 10 is a top view showing the region indicated by the circle in FIG. 9. As shown in FIG. 10, the groove of the light guide plate 403 (i.e., the white region on the left side in FIG. 10) is engaged with the protrusion of the light guide strip 404 (i.e., the white portion on the right side in FIG. 10) so that the light guide plate 403 and the light guide strip 404 contact with each other. In addition, the light guide strip 404 is fixed by the groove (i.e., the dark portion the right side in FIG. 10) thereof with the aid of the backboard of the backlight.

Figure 11:
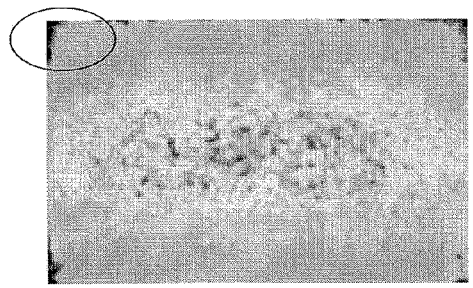
FIG. 11 is a diagram showing the optical simulation results in the conventional backlight.
Figure 12:
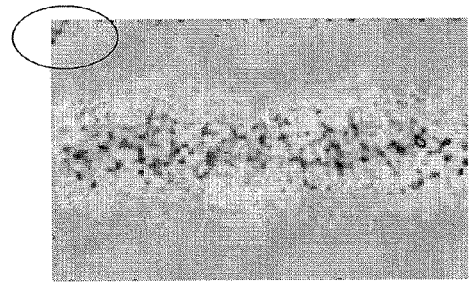
FIG. 12 is a diagram showing the optical simulation results in the first embodiment of the invention.

In the light guide device of the present embodiment, based on a backlight of side-emission type in which light sources are provided opposite sides of a light guide plate, light guide strips are provided on the other two opposite sides of the light guide plate and dot patterns are formed on the reflective surfaces of the light guide strips. The light entering into the light guide strips is modulated by the dot patterns which have different distribution density at different positions of the reflective surfaces, so that light with higher luminance at the two ends of the light guide strips and light with lower luminance in the middle portions of the light guide strips enter into the light guide plate. Thus the light guide strips are equivalent to side light sources in which the luminance distribution can be controlled uniformly. With comparison between FIG. 11 and FIG. 12, it is shown that the luminance uniformity in the light guide plate is improved and the dim region at the corner of the backlight is remarkably reduced or eliminated by using the light guide device in the present embodiment.

Second Embodiment

In the backlight of side-emission type of the present embodiment, a light source is provided on one of two opposite side surfaces of the light guide plate, a reflective film is provided on the side surface opposite to the side surface provided with the light source, and light guide strips are provided on the other two opposite side surfaces of the light guide plate in a manner similar with that in the first embodiment. The end surface of the light guide strips adjacent to the light source are the light entrance surfaces thereof, and reflective films are provided on the end surfaces opposite to the light entrance surfaces, the reflective surfaces, and the top and bottom surfaces of the light guide strips. Dot patterns on the reflective surface are distributed differently from those in the first embodiment. Specifically, dot patterns on the reflective surface have a larger distribution density at two ends of the reflective surface and have a smaller distribution density in the middle portion of the reflective surface, and the distribution density at the end away from the light source is larger than that at the end adjacent to the light source.

In the light guide device of the present embodiment, on the basis of the backlight of side-emission type in which a light source is provided on one of two opposite side surfaces of the light guide plate and a reflective film is provided on the side surface opposite to the side surface provided with the light source, light guide strips are provided on the other two opposite sides of the light guide plate and dot patterns are provided on the reflective surface of the light guide strips. The light entering into the light guide strips is modulated by the dot patterns which have different distribution density at different positions of the reflective surface, so that light with higher luminance at the two ends of the light guide strips and light with lower luminance in the middle portions of the light guide strips enter into the light guide plate. Therefore, the luminance uniformity of the light guide plate can be improved and the dim regions at the corner of the backlight can be remarkably reduced or eliminated.

Third Embodiment

Figure 13:
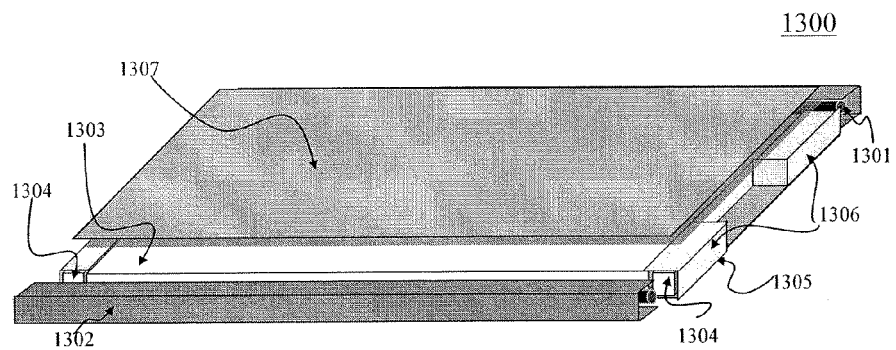
FIG. 13 is a structural schematic view showing a backlight of side-emission type according to a third embodiment of the invention.

In the light guide device 1300 shown in FIG. 13, on the basis of the backlight of side-emission type in which the light sources 1301 are provided on two opposite sides of the light guide plate 1303, two light guide strips 1306 are provided on each of the other two opposite side surfaces of the light guide device 1300. The two light guide strips 1306 are provided at the two ends of the corresponding side surface, respectively, and the end surfaces of the light guide strips 1306 adjacent to the light sources flush with the main light entrance surface of the light guide plate 1303. That is, the light guide strips 1306 are provided at each of the four corners of the light guide plate 1303.

The end surface of each light guide strip adjacent to the respective light source is the light entrance surface of the light guide strip, and reflective films are provided on the end surface opposite to the light entrance surface, the reflective surface and the top and bottom surfaces of the light guide strip. In addition, on each side surface of the light guide plate provided with the light guide strips, a reflective film is further provided to cover the portion uncovered by the light guide strip. In the present embodiment, the conditions that HP=HB and LB=HB/2 are also preferably satisfied, and the distance between the two light guide strips provided on the same side surface of the light guide plate 1303 is adjusted depending on the actual requirements. The forming method, the shape, and the arrangement of the dot patterns of the light guide strip are identical with those in the first embodiment, but the distribution density of these dot patterns can be different from that in the first embodiment. Specifically, dot patterns of the light guide strip in the present embodiment have a larger distribution density at the end adjacent to the light source and have a smaller distribution density at the end away from the light source.

In the light guide device 1300 of the present embodiment, on the basis of the backlight of side-emission type in which the light sources are provided on two opposite sides of the light guide plate, two light guide strips are provided on each of the other two opposite side surfaces of the light guide device, and dot patterns are provided on the reflective surface of each of the light guide strips. The light entering the light guide strip is modulated by the dot patterns on the reflective surface of the light guide strip and correspondingly the luminance distribution in the four corner dim regions of the backlight is adjusted. Therefore, the luminance uniformity of the light guide plate can be improved and the dim regions at the corners of the backlight can be remarkably reduced or eliminated.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. A light guide device, comprising:
   a light guide plate, and
   a light source provided on a side surface of the light guide plate, and
   a light guide strip provided on a side surface of the light guide plate intersecting with the side surface provided with the light source;
   wherein a side surface of the light guide strip facing the light guide plate is a light exit surface of the light guide strip, a side surface of the light guide strip opposite to the light exit surface is a reflective surface of the light guide strip, and an end surface of the light guide strip adjacent to the light source is a light entrance surface of the light guide strip.

2. The light guide device according to claim 1, wherein dot patterns are provided on the reflective surface of the light guide strip to modulate the light entering into the light guide strip.

3. The light guide device according to claim 2, comprising light sources provided on two opposite side surfaces of the light guide plate, and light guide strips provided on the other two opposite side surfaces of the light guide plate,
   wherein the side surfaces of the light guide plate provided with the light guide strips are in size equal to and flush with the light exit surfaces of the light guide strips, and the light sources extend from the light entrance surface of one of the light guide strips to the light entrance surface of the opposite light guide strip.

4. The light guide device according to claim 3, wherein each light guide strip has a larger distribution density of dot patterns at two ends of the light guide strip and has a smaller distribution density of dot patterns in a middle portion of the light guide strip, and the distribution densities of dot patterns at two ends of each light guide strip are equal to each other.

5. The light guide device according to claim 2, comprising light guide strips provided on the other two opposite side surfaces of the light guide plate,
   wherein the light source is provided on one of two opposite side surfaces of the light guide plate, the side surfaces of the light guide plate provided with the light guide strips are in size equal to and flush with the light exit surfaces of the light guide strips, and the light source extends from the light entrance surface of one of the light guide strips to the light entrance surface of the opposite light guide strip.

6. The light guide device according to claim 5, wherein each light guide strip has a larger distribution density of dot patterns at two ends of the light guide strip and has a smaller distribution density of dot patterns in a middle portion of the light guide strip, and the distribution density of dot patterns at the end of each light guide strip away from the light source is larger than that at the end of the light guide strip adjacent to the light sources.

7. The light guide device according to claim 2, comprising light sources provided on two opposite side surfaces of the light guide plate, and two light guide strips provided on each of the other two opposite side surfaces of the light guide plate, wherein the two light guide strips are provided at the two ends of the corresponding side surface, respectively, and the end surface of the light guide strips adjacent to the light sources flush with the main light entrance surface of the light guide plate.

8. The light guide device according to claim 7, wherein each of the light guide strips has a larger distribution density of dot patterns at the end adjacent to the light sources and has a smaller distribution density of dot patterns at the end away from the light sources.

9. The light guide device according to claim 8, wherein the light source extends from the light entrance surface of one of the light guide strips to the light entrance surface of the opposite light guide strip on the corresponding side surfaces of the light guide plate.

10. The light guide device according to claim 1, comprising light sources provided on two opposite side surfaces of the light guide plate, and light guide strips provided on the other two opposite side surfaces of the light guide plate,
    wherein the side surfaces of the light guide plate provided with the light guide strips are in size equal to and flush with the light exit surfaces of the light guide strips, and the light sources extend from the light entrance surface of one of the light guide strips to the light entrance surface of the opposite light guide strip.

11. The light guide device according to claim 10, wherein dot patterns are provided on the reflective surface of each the light guide strip, and
    wherein each light guide strip has a larger distribution density of dot patterns at two ends of the light guide strip and has a smaller distribution density of dot patterns in a middle portion of the light guide strip, and the distribution densities of dot patterns at two ends of each light guide strip are equal to each other.

12. The light guide device according to claim 1, comprising light guide strips provided on the other two opposite side surfaces of the light guide plate,
    wherein the light source is provided on one of two opposite side surfaces of the light guide plate, the side surfaces of the light guide plate provided with the light guide strips are in size equal to and flush with the light exit surfaces of the light guide strips, and the light source extends from the light entrance surface of one of the light guide strips to the light entrance surface of the opposite light guide strip.

13. The light guide device according to claim 12, wherein dot patterns are provided on the reflective surface of each the light guide strip, and
    wherein each light guide strip has a larger distribution density of dot patterns at two ends of the light guide strip and has a smaller distribution density of dot patterns in a middle portion of the light guide strip, and the distribution density of dot patterns at the end of each light guide strip away from the light source is larger than that at the end of the light guide strip adjacent to the light source.

14. The light guide device according to claim 1, comprising light sources provided on two opposite side surfaces of the light guide plate, and two light guide strips provided on each of the other two opposite side surfaces of the light guide plate,
    wherein the two light guide strips are provided at the two ends of the corresponding side surface, respectively, and the end surface of the light guide strips adjacent to the light sources flush with the main light entrance surface of the light guide plate.

15. The light guide device according to claim 14, wherein dot patterns are provided on the reflective surface of each the light guide strip, and wherein each of the light guide strips has a larger distribution density of dot patterns at the end adjacent to the light sources and has a smaller distribution density of dot patterns at the end away from the light sources.

16. The light guide device according to claim 15, wherein the light source extends from the light entrance surface of one of the light guide strips to the light entrance surface of the opposite light guide strip on the corresponding side surfaces of the light guide plate.

17. The light guide device according to claim 1, wherein the distance between the reflective surface and the light exit surface of the light guide strip is a half of the thickness of light guide plate.

* * * * *